No. 758,817. PATENTED MAY 3, 1904.
W. H. BROWN & J. WINSHIP.
DEVICE FOR MIXING AND APPLYING INSECTICIDE.
APPLICATION FILED MAY 4, 1903.
NO MODEL.
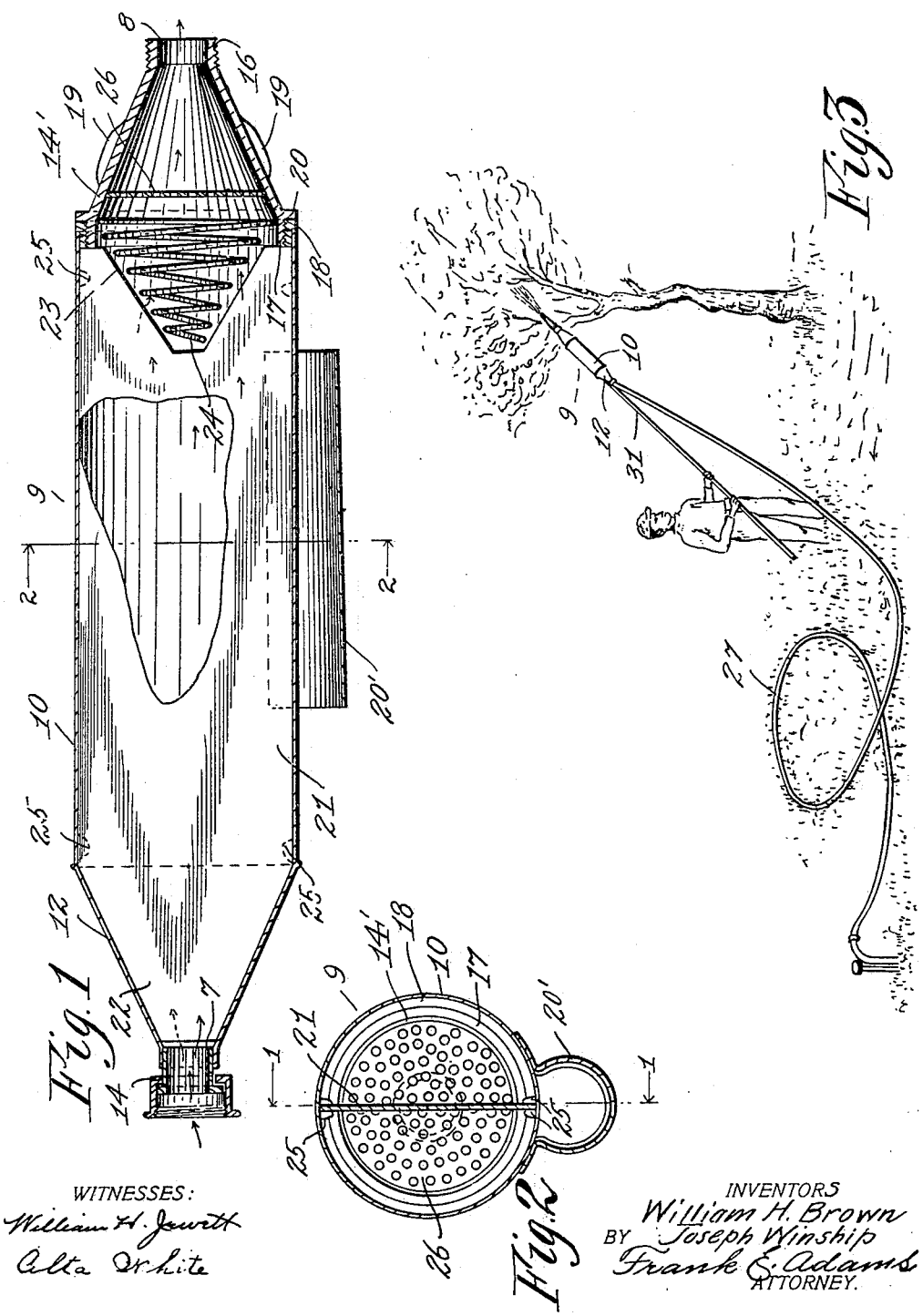
WITNESSES:
William H. Jewett
Alta White
INVENTORS
William H. Brown
Joseph Winship
BY Frank E. Adams
ATTORNEY.

No. 758,817. Patented May 3, 1904.

UNITED STATES PATENT OFFICE.

WILLIAM HENERY BROWN AND JOSEPH WINSHIP, OF SEATTLE, WASHINGTON; SAID WINSHIP ASSIGNOR TO SAID BROWN.

DEVICE FOR MIXING AND APPLYING INSECTICIDE.

SPECIFICATION forming part of Letters Patent No. 758,817, dated May 3, 1904.

Application filed May 4, 1903. Serial No. 155,663. (No model.)

*To all whom it may concern:*

Be it known that we, WILLIAM HENERY BROWN and JOSEPH WINSHIP, citizens of the United States of America, and residents of the city of Seattle, in the county of King and State of Washington, have invented certain new and useful Improvements in Devices for Mixing and Applying Insecticide, of which the following is a specification.

Our invention relates to improvements in devices for mixing and applying insecticide, and has special reference to a device of this class which is adapted to retain soluble matter in active communication with a flow of solvent fluid.

Among numerous objects attained by this invention and readily understood from the following specification and accompanying drawings, included as a part thereof, is the production of a simplified and inexpensive device for use in connection with spraying apparatus to retain soluble ingredients in active communication with a fluid-flow and embodying essential features of adaptability, utility, and general efficiency, which insures thorough mixing and dissolution of the ingredients and a more scientific compounding of the admixture and avoids clogging of the device.

The above-mentioned and other desirable objects are attained by the constructions, combinations, and arrangements of parts as disclosed on the drawings, set forth in this specification, and succinctly pointed out in the appended claims.

With reference to the drawings filed herewith and bearing like reference characters for corresponding parts throughout, Figure 1 is a side view of the device with the casing thereof shown in longitudinal section, taken on line 1 1 of Fig. 2 and viewed as the arrows indicate, and shows the partition therein with a portion broken away. Fig. 2 is a view of the casing shown in transverse section, taken on line 2 2 of Fig. 1, looking as the arrows indicate and shown with the conical screen removed; and Fig. 3 is a perspective view, on small scale, showing the device in use.

This invention includes a receptacle 9, which preferably consists of a casing 10, the main portion of which is formed tubular and preferably cylindrical and is composed of suitable sheet metal, as brass, copper, or like metal, which will not be affected by the chemicals placed in the receptacle. This casing is provided at one end with a head 12, which is made of sheet metal and formed with the inner surface conical shaped and is fixedly connected with the main portion of the casing and is provided with a suitable aperture 7 at the apex, which acts as the port of ingress for the fluid, and a suitable coupling part, as 14, is secured to the head at the apex for the connection of a suitable hose or the like with the receptacle. At the opposite end of the casing is a removable head 14', which is composed of plate metal and formed with the inner surface conical shaped, and this head is provided with a suitable aperture 8 in the apex, which is the port of egress for the admixture, and an outwardly-extending annular flange 16 about this aperture having screw-threads on the periphery, by means of which a suitable nozzle or the like can be conveniently connected with the receptacle to direct the discharging admixture in the form of spray. This head 14' is preferably formed with an annular shoulder 20 and an annular flange 17 of less diameter than the shoulder at the base end, and this flange is provided with screw-threads on the periphery which are adapted to engage corresponding screw-threads formed in the bore of bushing 18, secured in the end of the cylindrical portion of the casing, and thereby conveniently provide for the detachable connection of the said head with the casing, so that the receptacle can be separated for the placement therein of the desired ingredients, and suitable lugs, as 19, are arranged on the outer surface of the head to afford a better grasp for the hand to rotate the head, and a gasket is placed between said shoulder 20 and the end of the casing to effect a fluid-tight joint.

Upon the main body of the casing is secured a longitudinally-disposed tapering handle-socket 20', composed of a section of sheet metal of considerable length which is bent lengthwise to semicircular form, and a portion of this section is bent outwardly along each side edge to conveniently provide flanges by means of which the socket is secured to the casing by solder or the like. This socket is adapted to receive one end of a long handle, as 31, Fig. 3, by means of which the device can be manipulated and brought in close proximity to the branches of the trees it may be desired to spray without requiring the operator to mount ladders or the like, and a thorough spraying can be effected while the operator stands at such distance that the drippings will not fall upon his person.

Within the receptacle is a longitudinally-disposed removable partition 21, which divides the chamber into compartments. This partition is composed of plate metal of suitable width to fit snugly but slidably in the casing and is formed with one end, 22, tapered to fit within the fixed head of the casing with the outer extremity thereof in close proximity to the port of ingress at the apex of the head, so that the fluid-flow will be equally divided as it passes into the receptacle, and in the opposite end portion of this partition a substantially V-shaped notch, as 23, is formed to receive a conical screen 24, which is placed in the discharge end of the receptacle. Suitable inwardly-projecting guide-lugs 25 are secured on the inner surface of the wall of the casing 10 at diametrically opposite points to guide the partition to place, and the bushing 18 is provided with suitable slots at diametrically opposite points to receive the edges of the partition as it is placed in and removed from the receptacle.

In the removable head 14 of the casing is seated a transversely-disposed perforate diaphragm 26, which preferably comprises a circular section of perforate sheet metal, and in front of this diaphragm is placed a conical-shaped screen 24, preferably formed of a section of pliable wire bent to conical spiral form and disposed with the base end seated in said head adjacent the diaphragm, so that the screen will fit within the notch in the partition and be embraced thereby. This screen is adapted to hold the greater mass or larger particles of the ingredients employed from passing to the diaphragm, and thereby prevent clogging thereof, while the smaller particles or limited portions of the ingredients are carried forward to the diaphragm and retained thereby until fully dissolved, and the partition 21 serves to divide the chamber of the receptacle into compartments, each of which are in communication with both ports, and in these compartments ingredients of different kinds can be placed and are held apart by the partition, while the conical screen allows limited portions of the separated ingredients to pass forward and commingle at the diaphragm. Thus it will be seen that the compounding of the insecticide will be thoroughly and scientifically accomplished and the chances of clogging the receptacle reduced to a minimum.

By forming the screen 24 of pliable wire it can be readily extended or contracted to vary the pitch of the convolutions in conformity with the nature of the ingredients, so that the screen will act to properly retain the same, and by making the screen conical in form a comparatively extensive area of screening-surface is presented as a bearing-surface for the ingredients, which are thereby more fully exposed to the action of the dissolvent, while the partition in the receptacle renders it possible to use such ingredients as would combine and clog the receptacle if placed together therein *en masse*, and the conical form of the interior surfaces of the walls of the heads of the casing serves to insure a more equal distribution of the dissolvent to the compartments and free passage of the admixture to the port of egress.

When desired to use the receptacle for spraying trees or shrubbery with insecticide, the removable head is unscrewed and the desired ingredients or compounds are placed in the compartments—as, for example, whale-oil soap is placed in one compartment and paris-green in the other compartment. The head is then replaced and an ordinary spray-nozzle connected therewith. The receptacle is then coupled to an ordinary garden-hose, as 27, Fig. 3, which is connected with a source of fluid-supply delivered under pressure. An elongated handle is then seated in the socket on the casing and the device stands ready for use.

This device is simple and inexpensive of construction, has few parts likely to get out of order, and acts in a most scientific manner in compounding insecticide or the like.

Having thus described our invention, what we claim as new, and desire to secure by Letters Patent of the United States of America, is—

1. The combination of a receptacle of the nature indicated comprising a casing provided with a port of ingress and a port of egress, a perforate diaphragm arranged in said casing intermediate said ports, and a screen adjacent said diaphragm comprising a conical spiral.

2. The combination of a receptacle of the nature indicated comprising a casing provided with a port of ingress and a port of egress, a perforate diaphragm arranged in said casing adjacent the port of egress, a conical screen between the said diaphragm and port of ingress with the base adjacent the diaphragm, and a partition embracing said screen and extending to said port of ingress.

3. The combination of a receptacle of the nature indicated comprising a tubular casing having a head at each end provided with a port, a perforate diaphragm arranged in said casing adjacent one port, a conical screen between the diaphragm and the opposite port with the base adjacent the diaphragm, and a longitudinally-disposed partition embracing said screen and extending to the opposite head of said casing.

4. The combination of a receptacle of the nature indicated comprising a cylindrical tubular casing having a fixed head at one end formed with the inner surface conical shape and provided with a port of ingress at the apex, and a removable head at the opposite end formed with the inner surface conical shape and provided with a port of egress at the apex, a perforate diaphragm seated in said removable head, a conical screen also seated in the removable head with the base adjacent said diaphragm, a longitudinally-disposed partition removably seated in said casing and embracing said screen and extending to a point adjacent said port of ingress, and a handle-socket arranged on said casing.

Signed at Seattle, Washington, this 11th day of April, 1903.

WILLIAM HENERY BROWN.
JOSEPH WINSHIP.

Witnesses:
CHAS. E. ADAMS,
C. W. LAKIN.